United States Patent Office 3,313,614
Patented Apr. 11, 1967

3,313,614
METHOD OF MAKING AMMONIUM PHOSHATE-CONTAINING FERTILIZER
Kenneth Sharples, Healing, near Grimsby, and Alan George Sinclair, Grimsby, England, assignors to Fisons Fertilizers Limited, Suffolk, England
No Drawing. Filed Feb. 26, 1964, Ser. No. 347,374
Claims priority, application Great Britain, Mar. 5, 1963, 8,661/63
9 Claims. (Cl. 71—34)

The present invention relates to the preparation of fertilizers based on ammoniated phosphoric acid, It is well-known that monoammonium phosphate may be made by a process which comprises treating phosphoric acid with ammonia. In this process a hot aqueous solution of monoammonium phosphate is obtained which, at a sufficiently high water content and temperature to ensure adequate fluidity, can be processed to a granular fertilizer using a process which involves coating recycled fines with the slurry and drying. The recycled fines comprise solids of particle size less than product size obtained from the drying step. The disadvantages of this process stem from the high recycle rate which necessitates a large and expensive plant and the drying of a slurry containing more than 15% by weight of water. The present invention is concerned with a process which is cheaper to operate than the above, which uses plant already in existence at most fertilizer factories and yields a readily handleable solid material containing an ammonium phosphate which can be comminuted.

Accordingly the present invention is for a process for forming fertilizer materials containing ammonium phosphate which comprises ammoniating phosphoric acid, alone or in admixture with sulphuric acid to a pH in the range 5.5 to 6.7 such that a fluid slurry is obtained containing 5-25%, preferably 10-20% by weight of water and having a temperature in the range 100-130° C., and mixing the slurry at a temperature in this range with one or more acidic substances selected from the group consisting of phosphoric acid, triple superphosphate, single superphosphate and sulphuric acid, the acidic substance preferably having a temperature of 20-60° C. and containing not more than 38% by weight of water based on the weight of the acid, the slurry being mixed with the acidic substance in such proportions as to give a mixture having a pH of 4.0 to 5.0, said mixture solidifying to a handleable solid product which contains less than 10% by weight of water based on the weight of the mixture and which can be comminuted.

The pH values referred to in the present specification are those of a mixture at 20° C. obtained by diluting one part by weight of the material with nine parts by weight of water.

In the present specification single superphosphate represents a mixture of monocalcium phosphate, calcium sulphate and free acids obtained by the reaction of sulphuric acid with phosphate rock, and triple superphosphate is largely monocalcium phosphate and some free acid obtained by the reaction of phosphoric acid with phosphate rock.

The ammoniation of phosphoric acid is well-known and a number of methods of doing this have been proposed. Most commonly the ammoniation is conducted in one or more tanks containing a body of ammoniated phosphoric acid, into which is fed phosphoric acid and ammonia and from which is recovered a slurry of ammonium phosphate with accompanying steam. The product resulting from the ammoniation of the material containing phosphoric acid is a slurry which, at the given pH, water content and temperature, is of a sufficiently low viscosity to be readily flowable. Preferably the conditions are so selected that the water content is the minimal consistent with the adequate fluidity which is essential for the succeeding steps in the process of the present invention.

The heat of reaction provides most, if not all heat necessary to reduce the water content of the slurry to the desired level. In the process of the present invention this or any other method of ammoniating phosphoric acid may be employed.

If phosphoric acid is ammoniated by itself it is preferred that it should contain at least 40% $P_2O_5$ by weight, for example in the range 40-50% $P_2O_5$. When sulphuric acid is used in combination with the phosphoric acid the concentration of the phosphoric acid is preferably at least 30% $P_2O_5$, for example in the range 30-40% $P_2O_5$ by weight, and the concentration of the sulphuric acid is suitably at least 85% and preferably in the range 90-96% by weight of $H_2SO_4$. The proportion of phosphoric acid to that of sulphuric acid may be in the range one part by weight phosphoric acid (as 100% $H_3PO_4$) to 0.1 to 0.5 part by weight of sulphuric acid (as 100% $H_2SO_4$).

The slurry comprises a mixture of monoammonium phosphate and diammonium phosphate and possibly having present ammonium salts of sulphuric acid. The presence of the diammonium phosphate makes the slurry fluid compared with a composition containing the same amount of water but consisting of only monoammonium phosphate and it can therefore be readily mixed with the acidic substance with which it reacts at the appropriate concentration to form a solid product of low water content. This solid product forms virtually instantaneously.

When phosphoric acid is used as the acidic substance it is suitably used at a concentration greater than 45% $P_2O_5$, for example 45-50% $P_2O_5$. When sulphuric acid is used it is suitably used at a concentration greater than 70% by weight of $H_2SO_4$, for example 70-96% $H_2SO_4$. Other fertilizer material may be added along with the acid. An example of such a material is potassium chloride.

The type of mixer used when mixing the slurry with the acidic substance depends on whether the acidic substance is in the liquid or solid state. If the acidic substance is a liquid it is preferred to use a liquid-liquid mixing device of conventional design such as a venturi mixer. If on the other hand the acidic substance is a solid it is preferred to use a mixer provided with paddles, for instance a vertical high speed paddle or turbine mixer or a horizontal kneader-type mixer.

According to a preferred embodiment the slurry and the acidic substance are mixed for just such an interval of time as to obtain intimate mixing giving a solid or semi-solid product. Preferably the interval of time in the case of liquid/slurry mixing is less than 0.2 second and in the case of slurry/slurry mixing is less than one minute.

The reaction of the slurry and the acidic substance yields a solid product almost immediately on mixing or shortly thereafter. The resulting solid is desirably allowed to consolidate to a handleable solid by standing without any agitation for a period of, for example about ¼–1 hour. This consolidation is suitably carried out in a vented chamber, such as a den. This may comprise a den such as are used in the manufacture of superphosphate and may be adapted for either batch or continuous operation.

It is preferred to use a continuously operating den, and this suitably comprises a slow-moving conveyor on which the mixture of slurry and acidic material solidifies to be removed at the discharge end by a cutting device. An example of such a den is the Broadfield den. The product obtained from the den is a solid material having a water content less than 10% by weight, preferably less than 7% by weight. During its fall into the den and its passage through the den the product may lose some water as steam.

Other materials may be fed to the den along with the mixture of slurry and acidic substance. Superphosphates may be added in this manner.

The product obtained from the den being eminently suitable for granulation may be formed into a granular fertilizer using any of the methods available for granulating superphosphate materials. For instance, the product is comminuted, mixed with other fertilizer materials and granulated. The other fertilizer materials may be selected from single superphosphate, triple superphosphate, ammonium nitrate, ammonium sulphate, urea, potassium chloride and potassium nitrate. Granulation may be achieved by wetting the material to be granulated, tumbling the wetted material in a rotating drum at an elevated temperature and then drying the granules so formed in a rotary drier.

The following examples, in which parts and percentages are by weight, are given to illustrate the process of the invention.

EXAMPLE I

In a reaction vessel phosphoric acid containing 42% $P_2O_5$ is treated with anhydrous ammonia to form a slurry of pH 6.0 at a temperature of 120° C. by the heat of neutralisation and by additional heat. The slurry has the composition: 83% by weight of solids, 42% by weight of $P_2O_5$ and 13.0% by weight of N. Crystallisation from the slurry begins at about 70° C. but is not complete until the temperature is reduced to about 30° C. The relative density of the slurry at 100° C. is 1.58.

The slurry at a temperature of 110° C. is intimately mixed in a venturi mixer with phosphoric acid at 20° C. and containing 49% $P_2O_5$ to give a monoammonium phosphate product having a pH in the range 4.3 to 4.5 and a temperature on formation of 110° C. The residence time in the venturi mixer was approximately 0.05 second. The monoammonium phosphate product is dropped into a Boadfield den with a residence time of 20–30 minutes and is cut from the den by rotating knives to give a powdered substance having an approximate composition of 46% $P_2O_5$ and 11% N and a water content of 5%.

10 parts of this powdered product, 2 parts of muriate of potash and 10 parts of recycled fines are fed to a rotary granulator and there heated by hot gases to a temperature of 60° C. and sprayed with 4 parts of water. From the granulator the partially formed granules are passed to a rotary drier where they are contacted with air at 350° C. and dried to a water content of 0.5% by weight. The granules had an analysis 9.6% N, 40.2% $P_2O_5$ and 10.5% $K_2O$.

EXAMPLE II

Phosphoric acid was ammoniated as described in Example I but on this occasion the slurry obtained by the ammoniation of phosphoric acid is mixed in a venturi mixer with sulphuric acid containing 94% sulphuric acid to a pH of 4.3 to 4.5. The product was fed to a Broadfield den where it remained for 20 minutes before being cut out. A final product suitable for granulation was obtained containing approximately 43% $P_2O_5$ and 12% N and having a water content of 4%.

EXAMPLE III

Phosphoric acid was ammoniated as described in Example I but on this occasion the slurry obtained by ammoniation of phosphoric acid is added to a paddle or blunger mixer in which triple superphosphate at the slurry stage is being formed from phosphate rock and phosphoric acid. Additional phosphoric acid sufficient to reduce the pH of the slurry to 4.3 to 4.5 is also added to the mixer. The product at a temperature of 105° C. is dropped into a Broadfield den and on cutting from the den gives a product having an analysis of approximately 46% $P_2O_5$ and 8% N, and having a water content of 8%.

EXAMPLE IV

Phosphoric acid was ammoniated as described in Example I but on this occasion the slurry obtained by ammoniation of phosphoric acid is added to a paddle or blunger mixer in which single superphosphate at the slurry stage is being formed from phosphate rock and sulphuric acid. Additional sulphuric acid is added to the mixer to reduce the pH of the slurry to 4.3 to 4.5. The analysis of the final product from the mixer is approximately 31% $P_2O_5$ and 5% N, and having a water content of 7%.

EXAMPLE V

In a reaction vessel a mixture of one part of phosphoric acid containing 33% $P_2O_5$ and 0.17 part of sulphuric acid containing 96% sulphuric acid is treated with anhydrous ammonia to form a slurry of pH 6.1 at a temperature of 120° C. The slurry containing 14% water is mixed in a venturi or similar type mixer with 0.07 part of sulphuric acid containing 96% sulphuric acid to reduce the pH to 4.3 so giving a solid final product containing approximately two parts by weight of monoammonium phosphate and one part by weight of ammonium sulphate which is fed directly to the den. After 35 minutes the product is cut from the den to give a powdered solid having the approximate analysis 32% $P_2O_5$, 14% N and 23% $SO_4$, and a moisture content of 7%.

We claim:

1. A process for forming a fertilizer material containing ammonium phosphate which comprises ammoniating a phosphoric acid-containing material selected from the group consisting of phosphoric acid and mixtures consisting of phosphoric acid and sulphuric acid to a pH in the range 5.5 to 6.7 such that a fluid slurry is obtained containing 5–25% by weight of water and having a temperature in the range 100–130° C. and mixing the slurry at a temperature in this range with an acidic substance selected from the group consisting of phosphoric acid, triple superphosphate, single superphosphate, sulphuric acid and mixtures of these, the acidic substance containing not more than 38% by weight of water based on the weight of the acid, the slurry being mixed with the acidic substance in such proportions as to give a mixture having a pH of 4.0 to 5.0, said mixture solidifying to give a handleable solid product which contains less than 10% by weight of water based on the weight of the mixture and which can be comminuted.

2. A process for forming a fertilizer material containing ammonium phosphate which comprises ammoniating phosphoric acid containing at least 40% by weight of $P_2O_5$ to a pH in the range 5.5 to 6.7 such that a fluid slurry is obtained containing 5–25% by weight of water and having a temperature in the range 100–130° C. and mixing the slurry at a temperature in this range with an acidic substance selected from the group consisting of phosphoric acid, triple superphosphate, single superphosphate, sulphuric acid and mixtures of these, the acidic substance containing not more than 38% by weight of water based on the weight of the acid, the slurry being mixed with the acidic substance in such proportions as to give a mixture having a pH of 4.0 to 5.0, said mixture solidifying to give a handleable solid product which contains less than 10% by weight of water based on the weight of the mixture and which can be comminuted.

3. A process for forming a fertilizer material containing ammonium phosphate which comprises ammoniating a mixture consisting of one part by weight of phosphoric acid (as 100% $H_3PO_4$) and 0.1 to 0.5 part by weight of sulphuric acid (as 100% $H_2SO_4$) the phosphoric acid containing 30–40% by weight of $P_2O_5$ and the sulphuric acid containing 90–96% by weight of $H_2SO_4$, continuing the ammoniation to a pH in the range 5.5 to 6.7 such that a fluid slurry is obtained containing 5–25% by weight of water and having a temperature in the range 100–130° C. and mixing the slurry at a temperature in this range with an acidic substance selected from the group consisting of phosphoric acid, triple superphosphate, single superphosphate, sulphuric acid and mixtures of these, the acidic substance containing not more than 38% by weight of water based on the weight of the acid, the slurry being mixed with the acidic substance in such proportions as to give a mixture having a pH of 4.0 to 5.0, said mixture solidifying to give a handleable solid product which contains less than 10% by weight of water based on the weight of the mixture and which can be comminuted.

4. A process for forming a fertilizer material containing ammonium phosphate which comprises ammoniating a mixture consisting of one part by weight of phosphoric acid (as 100% $H_3PO_4$) to 0.1 to 0.5 parts by weight of sulphuric acid (as 100% $H_2SO_4$), the phosphoric acid containing 30–40% by weight of $P_2O_5$ and the sulphuric acid containing 90–96% by weight of $H_2SO_4$, continuing the ammoniation to a pH in the range 5.5 to 6.7 whereby a fluid slurry is obtained containing 5–25% by weight of water and having a temperature in the range 100–130° C. and mixing the slurry at a temperature in this range with phosphoric acid containing not more than 38% by weight of water based on the weight of the acid, the slurry being mixed with the phosphoric acid in such proportions as to give a mixture having a pH of 4.0 to 5.0, said mixture solidifying to give a handleable solid product which contains less than 10% by weight of water based on the weight of the mixture and which can be comminuted.

5. A process for forming a fertilizer material containing ammonium phosphate which comprises ammoniating phosphoric acid containing at least 40% by weight of $P_2O_5$ to a pH in the range 5.9 to 6.7 whereby a fluid slurry is obtained containing 10–20% by weight of water and having a temperature in the range 100–130° C. and mixing the slurry at a temperature in this range with phosphoric acid containing not more than 38% by weight of water based on the weight of the acid, the slurry being mixed with the phosphoric acid in such proportions as to give a mixture having a pH of 4.0 to 5.0, said mixture solidifying to give a handleable solid product which contains less than 10% by weight of water based on the weight of the mixture and which can be comminuted.

6. A process for forming a fertilizer material containing ammonium phosphate which comprises ammoniating phosphoric acid containing at least 40% by weight of $P_2O_5$ to a pH in the range 5.9 to 6.7 whereby a fluid slurry is obtained containing 10–20% by weight of water and having a temperature in the range 100–130° C. and mixing the slurry at a temperature in this range with sulphuric acid at a temperature of 20–60° C. and containing not more than 30% by weight of water based on the weight of the acid, the slurry being mixed with the sulfuric acid in such proportions as to give a mixture having a pH of 4.0 to 5.0, said mixture solidifying to give a handleable solid product which contains less than 10% by weight of water and which can be comminuted.

7. A process for forming a fertilizer material containing ammonium phosphate which comprises ammoniating a phosphoric acid-containing material selected from the group consisting of phosphoric acid and mixtures consisting of phosphoric acid and sulphuric acid to a pH in the range 5.9 to 6.7 such that a fluid slurry is obtained containing 10–20% by weight of water and having a temperature in the range 100–130° C. and mixing the slurry at a temperature in this range with an acidic substance selected from the group consisting of phosphoric acid, triple superphosphate, single superphosphate, sulphuric acid and mixtures of these, the acidic substance having a temperature of 20–60° C. and containing not more than 38% by weight of water based on the weight of the acid, the slurry being mixed with the acidic substance for just such an interval of time as to obtain intimate mixing and in such proportions as to give a mixture having a pH of 4.0 to 5.0, said mixture yielding a solid or semi-solid product which is allowed to consolidate by standing finally forming a handleable solid product which contains less than 10% by weight of water based on the weight of the product and which can be comminuted.

8. A process for forming a fertilizer material containing ammonium phosphate which comprises ammoniating a mixture consisting of one part by weight of phosphoric acid (as 100% $H_3PO_4$) to 0.1 to 0.5% parts by weight of sulphuric acid (as 100% $H_2SO_4$), the phosphoric acid containing 30–40% by weight of $P_2O_5$ and the sulphuric acid containing 90–96% by weight of $H_2SO_4$, continuing the ammoniation to a pH in the range 5.9 to 6.7 whereby a fluid slurry is obtained containing 10–20% by weight of water and having a temperature in the range 100–130° C. and mixing the slurry at a temperature in this range with phosphoric acid at a temperature of 20–60° C. and containing not more than 38% by weight of water based on the weight of the acid, the slurry being mixed with the phosphoric acid for a period of 0.03 to 0.2 seconds and in such proportions as to give a mixture having a pH of 4.0 to 5.0, said mixture yielding a solid or semi-solid product which is allowed to consolidate by standing finally forming a handleable solid product which contains less than 10% by weight of water based on the weight of the product and which can be comminuted.

9. A process for forming a fertilizer material containing ammonium phosphate which comprises ammoniating phosphoric acid containing at least 40% by weight of $P_2O_5$ to a pH in the range 5.9 to 6.7 whereby a fluid slurry is obtained containing 10–20% by weight of water and having a temperature in the range 100–130° C. and mixing the slurry at a temperature in this range with sulphuric acid at a temperature of 20–60° C. and containing not more than 30% by weight of water based on the weight of the acid, the slurry being mixed with the acidic substance for a period of 0.03 to 0.2 second and in such proportions as to give a mixture having a pH of 4.0 to 5.0, said mixture yielding a solid or semi-solid product which is allowed to consolidate by standing finally forming a handleable solid product which contains less than 10% by weight of water and which can be comminuted.

References Cited by the Examiner

UNITED STATES PATENTS

| | | | |
|---|---|---|---|
| 100,457 | 3/1870 | Shepard | 71—40 |
| 1,871,195 | 8/1932 | Ober et al. | 71—37 X |
| 2,036,494 | 4/1936 | Plummer | 71—43 X |
| 2,038,788 | 4/1936 | Harvey et al. | 71—40 |
| 2,116,866 | 5/1938 | Kniskern et al. | 71—43 |
| 3,124,159 | 3/1964 | Bridger et al. | 71—1 |

OTHER REFERENCES

Proceedings Fertilizer Industry Round Table (1959), pp. 88–100.

DONALL H. SYLVESTER, *Primary Examiner.*

T. D. KILEY, *Assistant Examiner.*